United States Patent Office 3,236,594
Patented Feb. 22, 1966

3,236,594
MANUFACTURE OF FINELY DIVIDED SILICA
Neil Hunter Ray, Northwich, England, assignor to Imperial Chemical Industries Limited, London, England, a corporation of Great Britain
No Drawing. Filed Jan. 24, 1963, Ser. No. 253,738
Claims priority, application Great Britain, Feb. 1, 1962, 3,848/62
5 Claims. (Cl. 23—182)

This invention relates to a process for making finely divided silica from silicon tetrafluoride, particularly to one that can be operated at ordinary temperatures without requiring special materials of construction, and which allows the fluorine to be readily recoverable in the form of a simple inorganic fluoride.

It is known to make finely divided silica by reacting silicon tetrafluoride with steam at temperatures of at least about 650° C. and preferably above 800° C. if substantially complete reaction is to be achieved. At ordinary temperatures, namely 15°–30° C., silicon tetrafluoride reacts only partially with water, according to the equation $$3SiF_4 + 2H_2O \rightarrow 2H_2SiF_6 + SiO_2$$

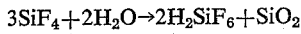

and the silica is obtained in the form of a gel which is difficult to isolate, costly to dry and possesses few valuable properties: it is for example useless as a reinforcing filler for rubber. The fluosilicic acid, either as such or in the form of its salts, is not suitable as a starting point for recovering fluorine.

We have now found a method by which silicon tetrafluoride can be completely hydrolysed at ordinary temperatures to yield silica in a finely divided state and in a form easily separable from the reaction system, and by which at the same time the fluoride can be recovered in the form of a simple fluoride of a metal or of ammonium from which if desired hydrogen fluoride can be readily obtained by reaction with acid.

According to our invention we provide a process for making finely divided silica comprising absorbing silicon tetrafluoride in a lower aliphatic alcohol to form a solution of a stable complex, reacting said solution with an inorganic base chosen from the group consisting of oxides and hydroxides of alkali metals and of alkaline earth metals and ammonium hydroxide, and with at least the stoichiometric weight of water required to hydrolyse the silicon tetrafluoride, and separating silica from the mixture of silica and metal fluoride or ammonium fluoride formed.

The silicon tetrafluoride may be substantially undiluted with other vapours, or it may form part of a gaseous mixture in which it is present in only minor amounts, for example the waste gases from the processing of phosphate rock in superphosphate manufacture.

The preferred aliphatic alcohols are methyl, ethyl and isopropyl alcohols, since these not only readily complex with silicon tetrafluoride but are miscible with water and with aqueous solutions of the oxides and hydroxides of the preferred metals sodium, potassium and calcium, and of ammonia.

If the metal fluoride co-formed with the silica is soluble in the alcohol, the silica is easily separated by filtration, and then by distillation of the alcoholic filtrate the alcohol can be recovered and the metal fluoride isolated for further use if desired. Ammonium fluoride is soluble in the alcohols and the solution may be distilled with a base, for example calcium hydroxide, to recover ammonia as such and fluorine as the corresponding metal fluoride.

If the metal fluoride co-formed with the silica is insoluble in the alcohol and in water, as is calcium fluoride, the silica may be separated from it by flotation or some other convenient physical method. If the metal fluoride is insoluble or only partly soluble in the alcohol but soluble in water, the silica can be isolated by adding water to dissolve the metal fluoride.

The invention is illustrated by the following examples.

*Example 1*

75 mls. of an aqueous solution of ammonia having a specific gravity of 0.910 was diluted to 200 mls. with ethanol, and then 200 mls. of a 1.0 molar solution of silicon tetrafluoride in ethanol was added at 25° C. with stirring during 45 minutes. The mixture was then stirred for a further 30 minutes and filtered. The filter cake was washed with 190 mls. of ethanol and then with an equal volume of water, and on drying at 105° C. yielded 15 g. of a silica containing approximately 20% of "bound" water and no significant amounts of any other material. By "bound" water is meant water that is not driven off at 105° C.

The filtrate was stirred with 37 g. of calcium hydroxide and distilled; the distillate contained 97% of the original alcohol, and 90% of the ammonia was recovered. The residue from the distillation consisted of 31 g. of calcium fluoride, which represents a 95% recovery of fluorine.

*Example 2*

200 mls. of a 1.0 molar solution of silicon tetrafluoride in ethanol was added during one hour to a solution of sodium hydroxide in ethanol containing 40 g. NaOH and 10 g. of water at 25° C. The precipitate was filtered off and stirred with 1500 mls. water, and the resulting suspension filtered again to yield silica which after drying at 105° C. amounted to 14 g. The filtrate contained sodium fluoride in solution, and on evaporation yielded 30 g. sodium fluoride.

*Example 3*

A gaseous mixture consisting of air containing 3% by volume of silicon tetrafluoride was passed up an absorption column at a rate of 3 cubic metres per hour. The column was 2 inches in diameter and 4 feet long, and was packed with ¼ inch porcelain rings. Ethanol was passed down the column at a rate of 4 litres per hour. The effluent from the base of the column consisted of a solution of silicon tetrafluoride in ethanol and containing about 10 g. of $SiF_4$ per 100 mls. of solution, and the concentration of silicon tetrafluoride in the gas leaving the top of the tower was below the limits of detection by infra-red spectrometry i.e. less than 0.05% by volume. 200 ml. of the solution of silicon tetrafluoride in ethanol were added during 20 minutes to a vigorously stirred suspension of 35 g. of calcium hydroxide in a mixture of 200 ml. of ethanol and 20 g. of water. The mixture was stirred for an hour to complete the reaction and then filtered. The residue weighed 52 g. after drying at 60°; the filtrate was substantially free from dissolved matter (residue left on evaporation to dryness was less than 0.1 g.). The solid was separated into two fractions by elutriation with water in a laboratory settler; the lighter fraction weighed 10.5 g. after drying at 120° C. and was shown to be nearly pure silica; the heavier fraction weighed 37.5 g. and was identified as calcium fluoride by X-rays (yield of $SiO_2$, ca. 83%; loss in elutriation, 2 g. or 40%).

What I claim is:

1. A process for making finely divided silica comprising absorbing silicon tetrafluoride in a lower aliphatic alcohol to form a solution of a stable complex, reacting said solution with an inorganic base chosen from the group consisting of oxides and hydroxides of alkali metals and of alkaline earth metals and ammonium hydroxide, and with at least the stoichiometric weight of water required to hydrolyse the silicon tetrafluoride, and separating silica from the mixture of silica and fluoride co-formed.

2. A process as claimed in claim 1 in which the aliphatic alcohol is chosen from the group consisting of methyl, ethyl and isopropyl alcohols.

3. A process as claimed in claim 1 in which the inorganic base is chosen from the group consisting of sodium hydroxide, calcium hydroxide and ammonium hydroxide.

4. A process for making finely divided silica comprising absorbing silicon tetrafluoride in ethyl alcohol to form a solution of a stable complex, reacting said solution with calcium hydroxide and with at least the stoichiometric weight of water required to hydrolyse the silicon tetrafluoride, and separating silica from the mixture of silica and calcium fluoride formed.

5. A process for making finely divided silica comprising absorbing silicon tetrafluoride in a lower aliphatic alcohol to form a solution of a stable complex, reacting said solution with an inorganic base selected from the group consisting of oxides and hydroxides of alkali and alkaline earth metals and ammonium hydroxide, and with at least the stoichiometric weight of water required to hydrolyse the silicon tetrafluoride at a temperature ranging from 15 to 30° C. and separating silica from the mixture of silica and fluoride co-formed.

References Cited by the Examiner
UNITED STATES PATENTS

| | | | |
|---|---|---|---|
| 2,269,059 | 1/1942 | McLachlan | 23—182 X |
| 2,386,337 | 10/1945 | Moyer | 23—182 |
| 2,690,430 | 9/1954 | Anderson | 23—88 X |

BENJAMIN HENKIN, *Primary Examiner.*

MAURICE A. BRINDISI, *Examiner.*

H. S. MILLER, *Assistant Examiner.*